Figure 1:
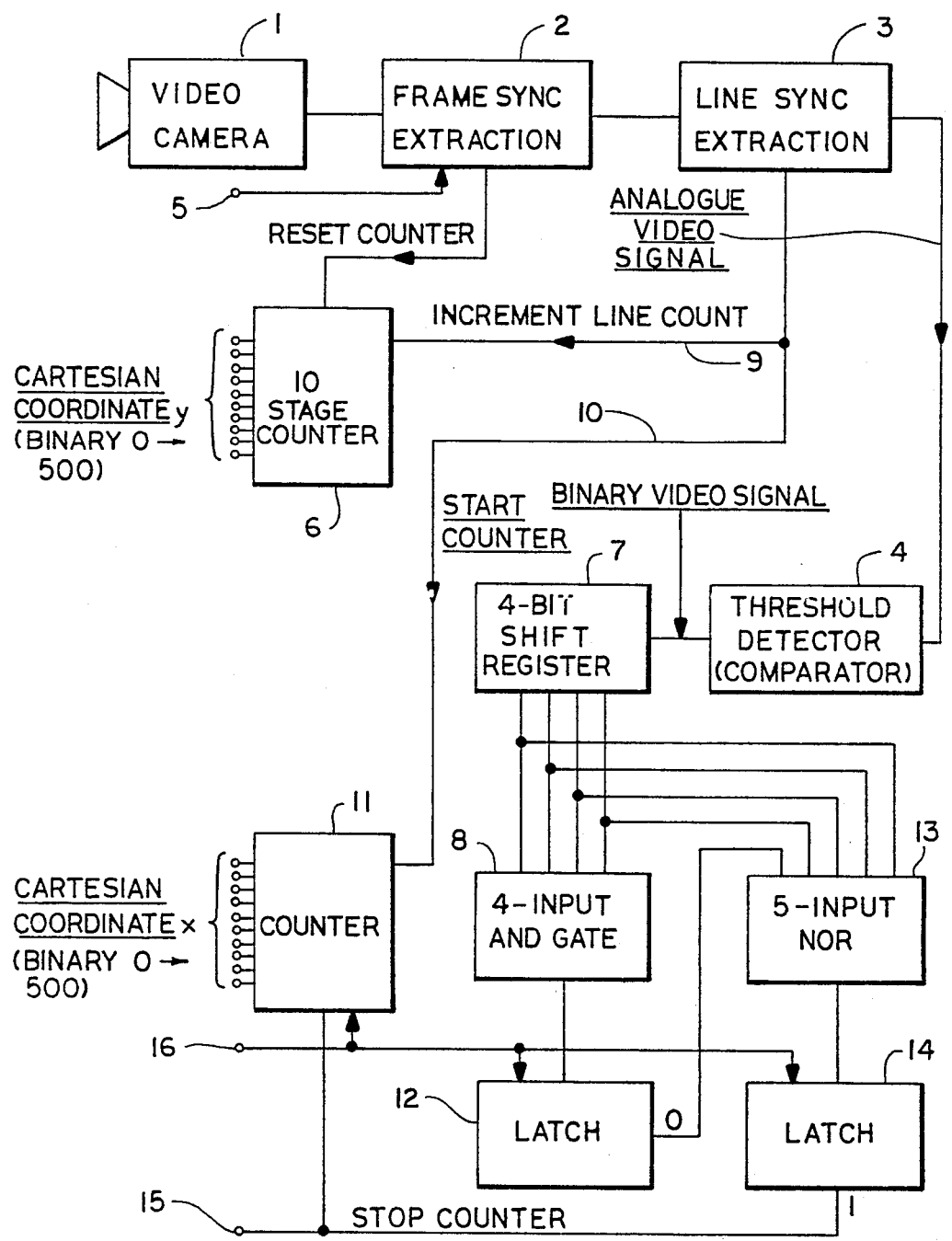

United States Patent [19]

Hobbs

[11] Patent Number: 4,581,633
[45] Date of Patent: Apr. 8, 1986

[54] DATA COMPRESSION

[75] Inventor: Keith C. Hobbs, Essex, England

[73] Assignee: International Standard Electric Corporation, New York, N.Y.

[21] Appl. No.: 471,545

[22] Filed: Mar. 2, 1983

[30] Foreign Application Priority Data

Mar. 4, 1982 [GB] United Kingdom ............ 8206372

[51] Int. Cl.⁴ .................................. H04N 7/18
[52] U.S. Cl. ....................................... 358/107
[58] Field of Search ...................... 358/107, 125

[56] References Cited

U.S. PATENT DOCUMENTS

| | | | |
|---|---|---|---|
| 3,551,052 | 12/1970 | Reiber | 358/107 |
| 4,017,680 | 4/1977 | Anderson | 358/107 |
| 4,034,401 | 7/1977 | Mann | 358/107 |
| 4,115,805 | 9/1978 | Morton | 358/107 |
| 4,115,806 | 9/1978 | Morton | 358/107 |
| 4,158,853 | 6/1979 | Sullivan | 358/107 |
| 4,159,522 | 6/1979 | Zanoni | 358/107 |
| 4,367,487 | 1/1983 | Klein | 358/107 |

*Primary Examiner*—Howard W. Britton
*Attorney, Agent, or Firm*—T. L. Peterson; J. S. Christopher

[57] ABSTRACT

A video image of a relatively simple nature is produced by scanning using a conventional TV camera (1), and the scan results are converted into a Cartesian co-ordinate form for image analysis. This involves seeking a point of interest during the scan, the number of scan steps along a scan line as indicated by a counter (11) defining the point's location along the line. The point of interest's location in the other co-ordinate is indicated by the setting of a scan line counter (6). After each detection of a point of interest its location is indicated to associated equipment and the scan is resumed. As described this is used in an eye follower of the type described in our U.S. Pat. No. 1,581,018 the image analysis being used to assess the directions in which the eye is looking. The result of this assessment is used to exercise a controlling function or a machine or other device, e.g. to enable a disabled person to control such a machine or device.

5 Claims, 3 Drawing Figures

DATA COMPRESSION

This invention relates to data compression, especially where used in respect of a video image of a relatively simple nature.

A single frame of a 625 line TV picture has approximately 600×500=300,000 picture elements (pixels) for a normal resolution picture. Each pixel may need up to eight bits to digitally define the greay scale, so a single frame needs 2.4 Mbits of storage if compression is not used. Where a relatively simple image is to be scanned, e.g. to locate a point of interest on that image, the above arrangement is too complex and expensive. Hence an object of the invention is to provide a data compression technique more suited to relatively simple images.

According to the invention there is provided a method of processing a video image, in which the image is generated by scanning a field of interest with a TV camera, the image thus generated being scanned to find the position of a point of interest on the image, the point of interest being represented by the change from light to dark or vice versa, in which the scanning for said point of interest is effected on a line-by-line basis, in which the location of a point of interest is indicated in a two-co-ordinate manner, in which one co-ordinate is determined by the setting of a counter started at the commencement of a line scan and stopped when a said point of interest is detected, and in which the other co-orginate is determined from the number of the line on which the point of interest was detected.

Thus the indentification of the point of interest is represented in Cartesian co-ordinate form. Such an arrangement is suitable for the image analysis needed to determine the direction sight of an operator or user. A system for making such determination is described in our U.S. Pat. No. 1,581,018, in which system a closed-circuit TV camera is used to scan an operator's or user's eye, and the direction in which the eye is looking is determined from an analysis of the image of the eye thus produced.

Figure 2:
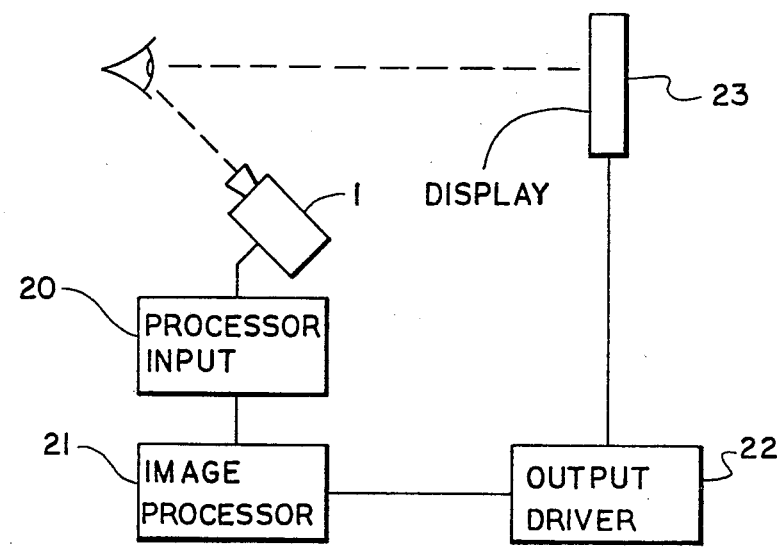
Figure 3:
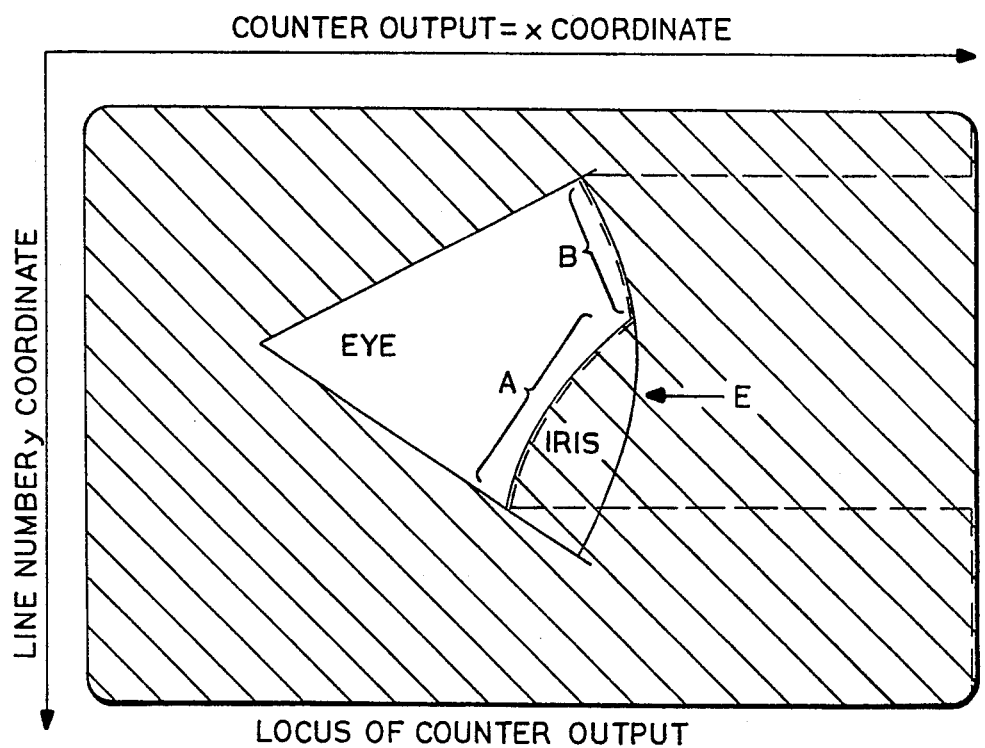

An embodiment of the invention will not be described with reference to the accompanying drawings, in which FIG. 1 is a block diagram of a data compression circuit used in the analysis of a video image, FIG. 2 is a block diagram illustrative of an eye follower system with which the system of FIG. 1 may be used and FIG. 3 illustrates the image processing technique used.

We now refer to FIG. 1, which is a block diagram of a system for processing an image of a human eye to determine from the position of the eye on the image the direction in which the user is looking. The output from a video camera 1 passes via a frame synchronisation extraction circuit 2 and a line synchronisation extraction circuit 3 to an analogue output on which there appears the analogue video signal for the image the which the TV camera 1 is aimed. This analogue signal is supplied to a threshold detector (comparator) 4 the output of which is a two-state non-return to zero signal, the two states respectively representing black and white.

When the image scanning commences, a signal on a frame request input 5 switches on the frame synchronisation extraction circuit 2, which via the connection shown resets to zero a scan line counter 6. This is a ten stage binary counter whose setting is advanced by unity for each line scanned.

When, as is usually the case, the video signal includes noise, it is necessary for a change from white to black to be indicated by a number, four in this case, of black pixels following four white pixels. To do this, the binary video signal is passed into a four-bit shift register which is clocked at the pixel rate. The outputs of this register are gated by a four-input AND gate 8 to detect four consecutive elements of the same kine (1 or 0). This removes short bursts of interference on the video image.

We now revert to the line synchronisation extraction circuit 3: This has two further outputs one of which, 9, is used to increment the line counter 6 so that it steps once per line scanned. The other output 10 is used to start a counter 11, which counts the number of steps made along the line while the camera is scanning. When the gate 8 gives its output on detection of a change to four similar pixels, it sets a latch 12 whose output is applied to a five input NOR gate 13 and this, with the conditions on its other four inputs sets a second latch 14 when four pixels of the other sort have been detected. Thus the setting of the latch 14 indicates the detection of four black pixels following four white pixels. Hence the circuit has detected the position of the point of interest. Via its output the latch 14 now stops the counter 11. Hence the current state of the two counters indicates the position of the point of interest.

The settings of these two counters are now passed to associated circuitry (not shown) where it is stored and processed as desired in response to an output 15 from the device. Then a line reset signal on the input 16 resets the counter 11 and the latches 12 and 14, and scanning is resumed. Thus the position of one or more points of interest are detected and processed.

The system as used to process an eye image is as shown in FIG. 2. Here we see the video camera 1 whose output feeds a processor input board 20 the details of which have just been described with reference to FIG. 1. The output of this block, which is a word per line scanned, derived as described above is applied to an image processor and shape analyser 21, whose output is applied to an output driver 22. This controls a display 23, which may be an array of light-emitting diodes.

The image processing is software controlled in the manner indicated in FIG. 3, and the following discussion. On lines which do not intersect the image of the eye, the line counter counts to 512 and then stops. These lines are ignored when the multi-bit words representing the image are processed in the software. The relevant iris limbus A, FIG. 3, is extracted from irrelevant eyeball information B by testing the rate of change of the tangent to the locus. Thus we have:

$$\frac{d2_x}{dy^2} = \text{negative for B}$$

$$\frac{d2_x}{dy^2} = \text{positive for A}$$

Then the output of the processor is determined by comparing the ellipse of the iris limbus with look-up tables.

The image information is stored as an eight-bit count per line scanned and processed in software to smooth the data, extract iris information and analyse the shape of the eye limbus. The eccentricity and elevation of the minor axis of the ellipse E uniquely define the eye position and may be compared with the information in the look-up tables to determine the appropriate output.

As has been indicated in our above-mentioned Patent Specification, the output which defines the direction in which the eye is looking can be used to position a controlled device. This is valuable for the control of machinery by disabled persons, and also for remote control of machinery where direct contact is inconvenient or not possible.

I claim:

1. Apparatus for determining the location of a point of interest in a television picture, said apparatus comprising:
   a television camera to generate an image by scanning a field of interest;
   circuit means connected with said television camera;
   a Y cartesian coordinate counter connected from said circuit means;
   an X Cartesian coordinate counter connected from said circuit means;
   a threshold detector to produce binary video responsive to the output of said circuit means and dependent upon whether or not an element in a line scanned is light or dark;
   a shift register to store each binary bit of said binary video serially as it is produced by said threshold detector;
   a first latch having a "0" output;
   AND gate means responsive to the output of said shift register when said binary video is one amplitude; and
   NOR gate means responsive to the output of said shift register and responsive to the output of said first latch to sample at least said X Cartesian coordinate counter.

2. The invention as defined in claim 1, wherein:
   a second latch is connected from said NOR gate means to stop said X Cartesian coordinate counter from counting.

3. The invention as defined in claim 2, wherein:
   said NOR gate means includes a NOR gate.

4. The invention as defined in claim 3, wherein:
   said NOR gate is connected from at least one bit in said shift register and from the "0" output of said first latch.

5. The invention as defined in claim 4, wherein:
   said shift register includes a plurality of bits,
   the output of each of said shift register bits being connected to both said AND gate means and said NOR gate means.

* * * * *